April 29, 1941.                H. L. DOWELL                 2,240,392
                                  NOZZLE
                            Filed Dec. 23, 1938
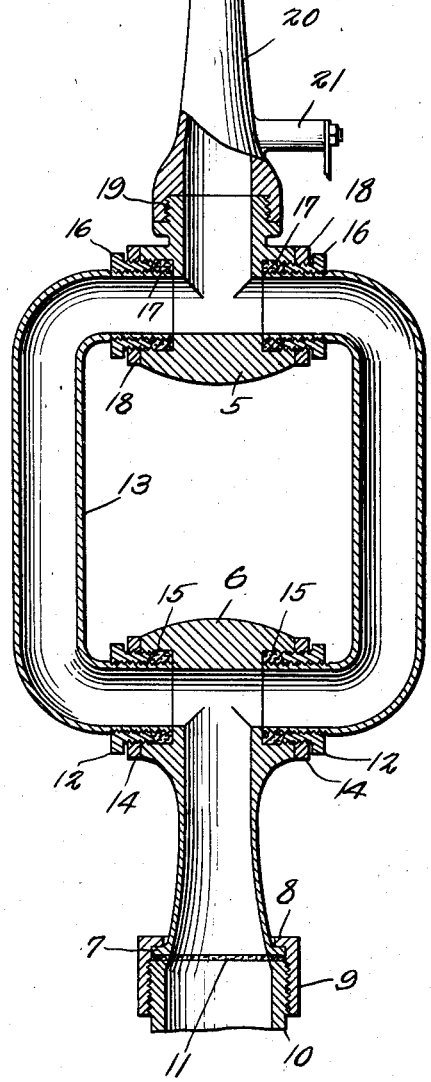
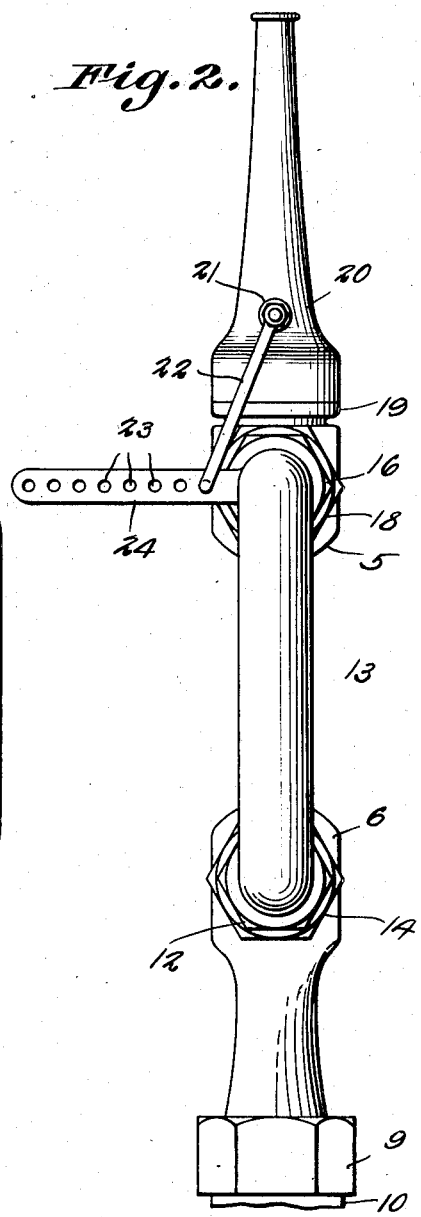
H. L. Dowell
INVENTOR.
BY CA Snow & Co.
ATTORNEYS.

Patented Apr. 29, 1941

2,240,392

UNITED STATES PATENT OFFICE 2,240,392

NOZZLE

Henry Lonnie Dowell, Athens, Tex., assignor of one-half to B. S. Allen, Dallas, Tex.

Application December 23, 1938, Serial No. 247,469

1 Claim. (Cl. 299—57)

This invention relates to nozzles designed primarily for use in connection with fire hose.

The primary object of the invention is to provide a fire hose nozzle which may be adjusted to direct a stream in any desired direction without the necessity of kinking or bending the hose.

Another important object of the invention is to provide a nozzle wherein the water passing therethrough will hold the nozzle in balance, and eliminate recoil, with the result that the nozzle will remain in any desired position in which it may be placed, and will not be affected by the water pressure passing through the nozzle, which would otherwise move the nozzle and change the direction of the stream of water from the nozzle.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a longitudinal sectional view through a nozzle constructed in accordance with the invention.

Figure 2 is a side elevational view thereof.

Referring to the drawing in detail, the nozzle comprises a body portion including pipe sections 5 and 6, the pipe section 6 being substantially long and provided with an annular flange 7 at one end thereof for cooperation with the flange 8 of the threaded sleeve 9 that engages the threads of the union 10, which is connected with the hose. A gasket indicated at 11 is disposed between one end of the union 10 and annular flange 7, so that a fluid tight connection is provided between the union 10 and flange 7. This connection between the union 10 and pipe 6 also permits of rotary movement of the pipe section 6 with respect to the union, or vice versa. The pipe sections 5 and 6 are provided with substantially T-shaped bores, and as shown the pipe section 6 has threads that cooperate with threads of the nuts 12, which also move over threads disposed at the inner right angled ends of the pipes 13. Lock nuts 14 are provided and move over the threads of the nuts 12, holding the nuts 12 in their active positions. Packing indicated at 15 is disposed between the inner ends of the nuts 12 and openings in which the pipes 13 extend, providing a fluid tight connection between the pipe section 6 and pipes 13 permitting at the same time pivotal movement of the pipes 13 within the openings of the pipe section 6.

The opposite ends of the pipe sections 13 extend into bores of the pipe section 5, and are provided with threads to accommodate the threads of the nuts 16 which bear against the packing 17 held within the bores of the pipe section 5, providing a water tight connection at this point. Lock nuts 18 are positioned on the nuts 16, and secure the nuts 16 in their positions of adjustment. This connection also permits of pivotal movement of the pipe section 6 with respect to the ends of the pipes 13 extended into the pipe section 5.

The pipe section 5 is formed with a threaded extension 19 over which the nozzle 20 is positioned. Extending from the nozzle 20 is an arm 21 to which the arm 22 is pivotally connected. The arm 22 is provided with a right angled end portion adapted to fit in the openings 23 of the arm 24 that extends from one of the pipe sections 13 with the result that by moving the nozzle 20 and positioning the right angled end of the arm 22 in a predetermined opening 23, the nozzle 20 will be held in various angular positions with respect to the pipe sections 13.

From the foregoing it will be seen that due to the construction shown and described, water passing through the body portion is divided and passed to the nozzle 20, through both of the pipe sections 13, thereby balancing the pressure at the nozzle 20 and eliminating any possibility of recoil of the nozzle, when water under pressure is directed thereto.

It will also be seen that due to this construction the body portion may be swung to practically any desired angular position to direct a stream of water in any particular location.

The pipe sections 13 also provide handles by means of which the body portion may be conveniently handled and moved.

What is claimed is:

A fire hose nozzle comprising an inlet section and an outlet section, means for securing the inlet section to the discharge end of a hose, said inlet and outlet sections having lateral openings, connecting pipes connecting the sections, said connecting pipes having inwardly disposed right angled ends mounted for swivel movement in the lateral openings of the inlet and outlet sections, an extension on the outlet section, a nozzle fitted on the extension, said connecting pipes providing a wide base for said nozzle, an arm rising from one of the pipes, said arm having a plurality of spaced openings, and an arm pivotally connected with the nozzle and having a right angled end adapted to fit in said openings, securing the nozzle in various angular positions with respect to the outlet openings.

HENRY LONNIE DOWELL.